D. D. SMITH.
INSECT DESTROYER.
APPLICATION FILED APR. 6, 1920.
1,433,856.
Patented Oct. 31, 1922.
3 SHEETS—SHEET 1.
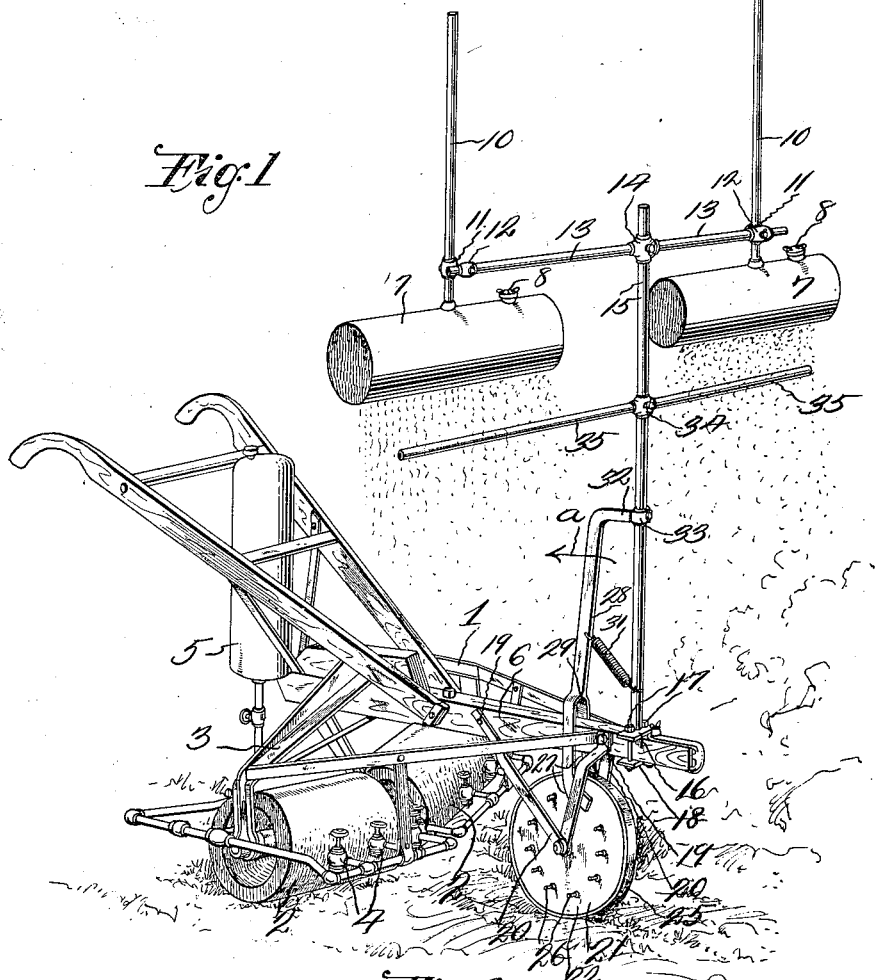
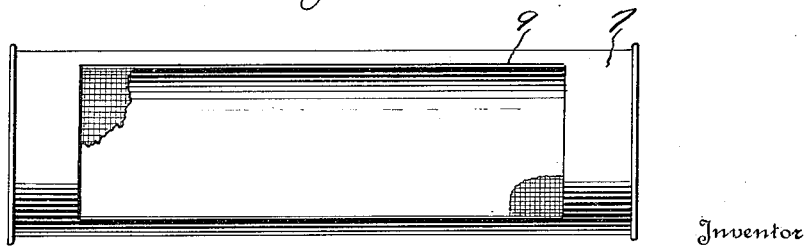
Inventor
D. D. Smith
By D. Swift
his Attorney

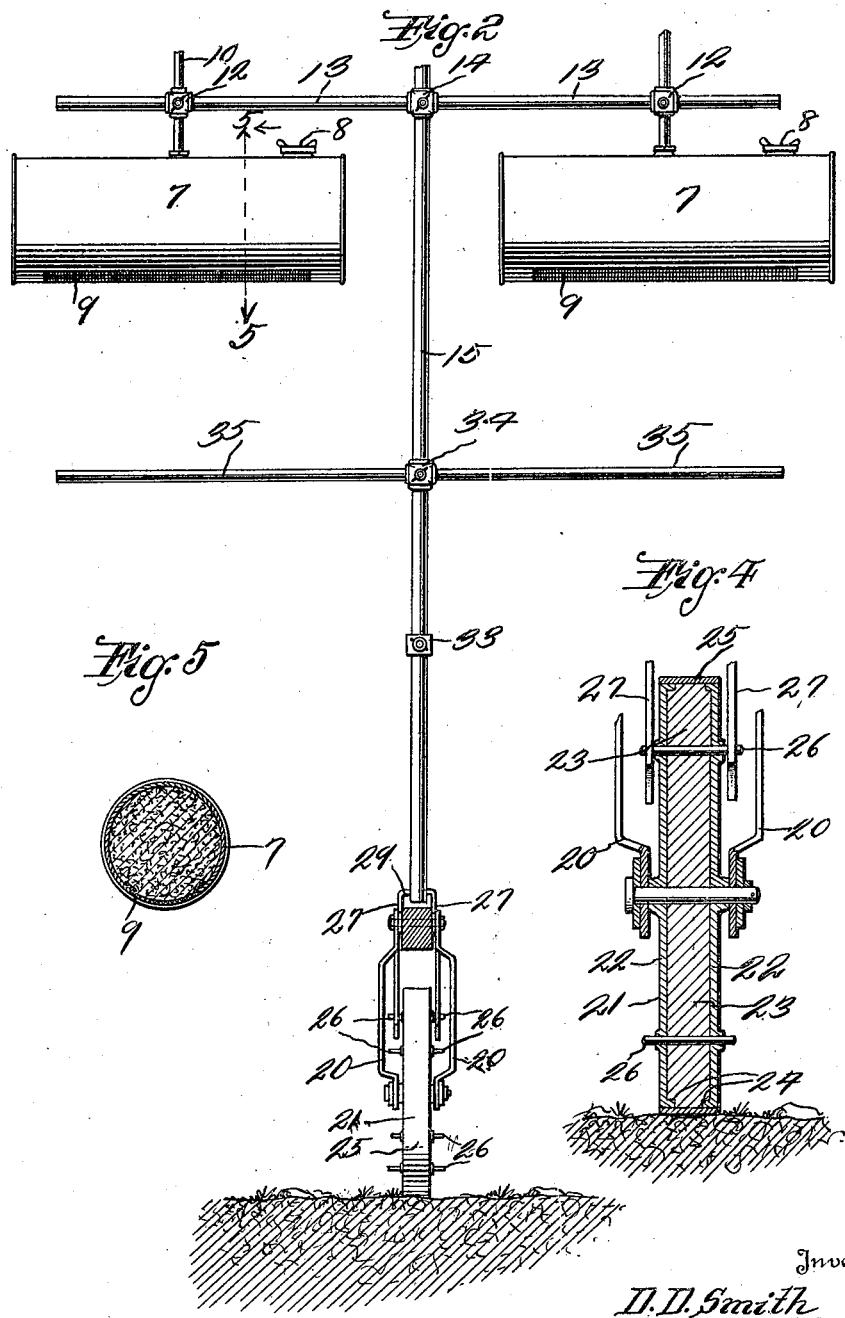

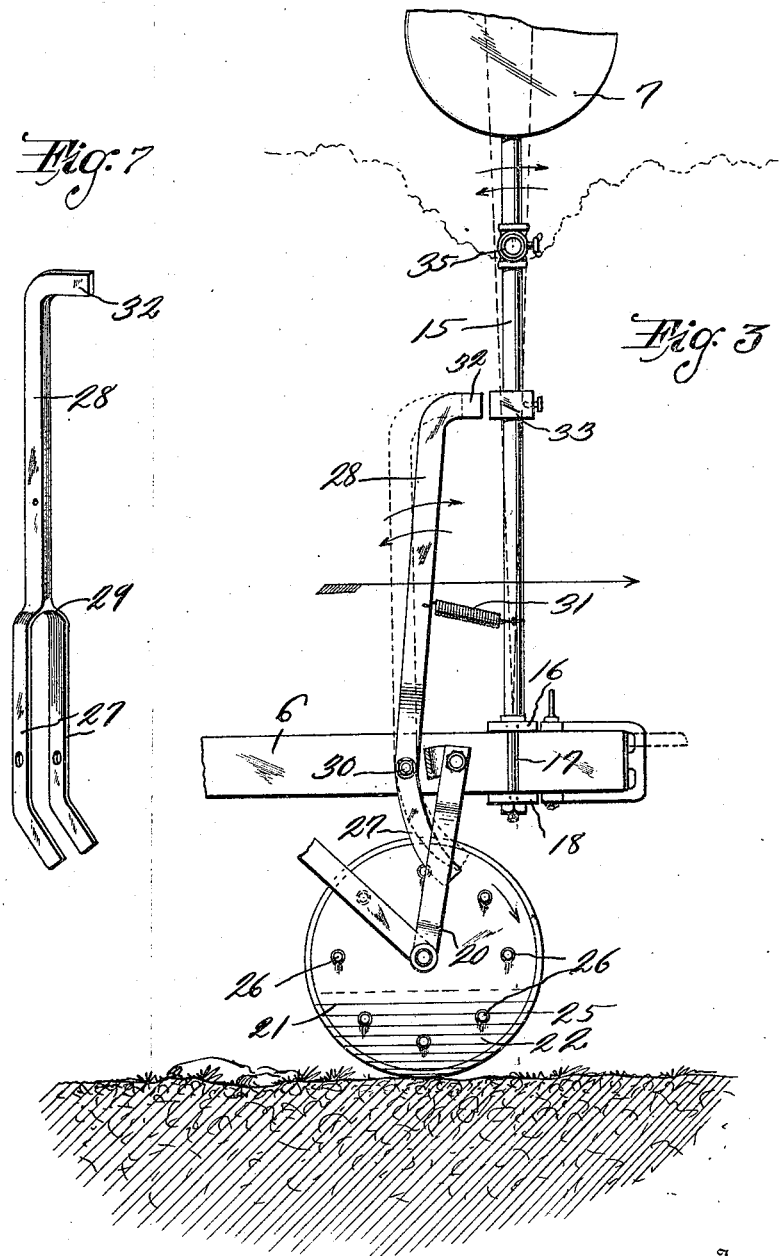

Patented Oct. 31, 1922.

1,433,856

UNITED STATES PATENT OFFICE.

DANIEL D. SMITH, OF VALDOSTA, GEORGIA.

INSECT DESTROYER.

Application filed April 6, 1920. Serial No. 371,678.

*To all whom it may concern:*

Be it known that I, DANIEL D. SMITH, a citizen of the United States, residing at Valdosta, in the county of Lowndes, State of Georgia, have invented a new and useful Insect Destroyer; and I do hereby declare the following to be a full, clear, and exact description of the invention, such as will enable others skilled in the art to which it appertains to make and use the same.

The invention relates to insect destroyers and powder distributers and has for its object to provide a device of this character particularly adapted for use in connection with boll-weevil destroyers and so constructed that it may be detached therefrom and used in connection with various types of plow beams so that plants may be dusted with powder, or if so desired fertilizer may be distributed from receptacles, which receptacles are intermittently vibrated by a ground engaging element.

A further object is to provide a powder distributing attachment particularly adapted for use in connection with the insect destroyer shown in my Patent No. 1,302,095 issued April 29, 1919, and particularly to provide an upright rod which may be easily and quickly attached to a plow beam, said rod having an adjustable transverse rod mounted thereon, to the ends of which transverse rod, screen containers are adjustably carried with their screened portions downwardly disposed, and to vibrate the upright rod by a hammer pivoted to the plow beam and having its lower end disposed so that it will be engaged by pins of a ground engaging wheel carried by the plow beam, said hammer being forced into engagement with the upright rod by a spring.

A further object is to provide transversely disposed arms vertically adjustable on the upright rod and disposed below the containers for preventing the taller plants from engaging the under faces of the containers, said transversely disposed rod also forming means for bending the plants over so that the powder will be sprinkled upon the plants adjacent their lower ends.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of a weevil destroyer showing the powder duster and fertilizer distributer attached thereto.

Figure 2 is a sectional view through the plow beam showing the container supporter in front elevation and parts being broken away to show the tripping mechanism for the hammer.

Figure 3 is an enlarged side elevation of the hammer tripping mechanism and adjacent structure.

Figure 4 is a sectional view through the ground engaging wheel.

Figure 5 is a sectional view through one of the powder containers taken on line 5—5 of Figure 2.

Figure 6 is a bottom plan view of one of the powder containers showing the screened opening.

Figure 7 is a perspective view of the hammer member.

Referring to the drawings, the numeral 1 designates a boll weevil destroyer of the type wherein rollers 2 are carried by a frame 3, which frame supports burners 4 which project flames onto the rollers so that they will be heated to such an extent that as they roll over the ground between rows of plants they will kill weevils and their eggs, also other insects which may be on the ground. Fuel is supplied to the burners 4 from a fuel tank 5 carried by the frame 3. The frame 3 has secured thereto a beam 6, which beam is substantially the same as the beam of a plow and is provided at its forward end with means whereby draft animals may be secured to the destroyer for moving the destroyer forwardly.

During the boll weevil killing operation the plants are sprinkled with an insecticide, preferably a powder from containers 7. The containers 7 are provided with filling openings 8 on their upper sides and with screened openings 9 on their under side. The mesh work of the openings 9 is of such a mesh that normally the powder within the containers will not pass through the mesh, but of such a mesh that the powder will be caused to pass through the mesh when the containers are vibrated. The containers 7 have upwardly extending rods 10, which rods are adjustably secured in sleeves 11, which sleeves have connected thereto sleeves 12 which are adjustably secured on the transversely disposed arms 13 carried by a vertically adjustable sleeve 14. The sleeve 14 may be adjusted upwardly and downwardly on the vertical supporting rod 15 so that the containers may be adjusted for different heights of plants. By providing the vertically adjustable rods 10, it will also be seen that the adjustments may be made for various heights of plants by adjusting the rods 10 in the sleeves 11. The supporting rod 15 has secured to its lower end a plate 16, which plate is adapted to engage the upper face of the beam 6 and to be secured to said beam by means of bolts 17 which pass through the plate 15 and through the ends of a plate 18 engaging the under face of the beam 6. It will be noted by so securing the supporting rod 15 to the beam 6 that it will not be necessary to drill the beam therefore it will be seen that the supporting rod 15 may be quickly and easily applied to the beam of a plow or cultivator. Secured to the sides of the beam 6 by means of bolts 19 are downwardly extending brackets 20, which brackets have rotatably mounted in bearings thereof a ground engaging wheel 21, which is adapted to engage the ground and be caused to rotate as the destroyer as a whole moves forwardly. The wheel 21 is formed from a pair of spaced plates 22 between which the wooden disc 23 is disposed. The peripheral edges of the discs 22 being provided with the inwardly extending flanges 24 which engage the rabbets in the wooden disc 23, there being a metallic tread 25 which may be welded or otherwise secured to the flanges 24 of the plates 22. Extending through the wheel 21 are pins 26, the ends of which project beyond the faces of the wheel so that as the wheel revolves the pins 26 will engage the arms 27 of a hammer 28, said arms being formed by a bifurcation 29 in the lower end of the hammer 28 and as the pins 26 continue forwardly the lower ends of the arms 27 will also be forced forwardly thereby causing the hammer 28 to move in the direction of the arrow $a$ on its pivotal point 30. As the hammer moves in the direction of the arrow $a$, a coiled spring 31, which has one of its ends connected to the hammer and its other end connected to a supporting rod 15, is stretched until the particular pin which is in engagement with the lower ends of the arms 27 passes out of engagement with said arms so that the hammer will be released thereby allowing the coiled spring 31 to force the hammer head 32 into engagement with the adjustable striker sleeve 33 carried by the supporting rod 15. The successive percussive blows of the hammer head 32 will cause the supporting rod 15 to vibrate and also the containers 7 to vibrate thereby causing the powder within the containers to pass through the wire mesh of the openings 9 and be sprinkled onto the plants on either side of the destroyer. By providing a series of pins 26, it will be seen that the vibration will be practically a continuous one and that the powder will therefore be uniformly sprinkled.

Adjustably secured on the supporting rod 15 so that it may be moved and adjusted vertically is a sleeve 34, which sleeve has outwardly extending arms 35. The arms 35 are disposed below the containers 7 and engage the plants as the destroyer advances between the rows, bends the plants over after a certain amount of powder has been deposited on the same so that as they slowly bend the powder will also be deposited on the plant adjacent their lower ends. The outwardly extending arms also prevent the taller plants from coming into engagement with the containers 7, and consequently interfering with the vibration of the containers to a certain extent.

From the above it will be seen that a powder distributer is provided which may be easily and quickly applied to the beam of a plow or weevil destroyer in such a manner that the beam will not be weakened and by simply boring holes in the beam for the bolts 19 and 30. It will also be seen that a plant powdering device is provided wherein the powder container will be vibrated for dislodging the powder from the containers during the forward movement of the destroyer or plow to which the device may be applied. It is to be understood that any kind of powder may be distributed also that a fluid may be used in the containers and fertilizer if so desired.

The invention having been set forth what is claimed as new and useful is:—

1. A distributer comprising a horizontally disposed beam, a ground engaging wheel disposed below said beam, a vertically disposed vibratory rod carried by said beam forwardly of the center of the wheel, powder receiving receptacles carried by said rod, a hammer pivoted to the beam, one arm of said hammer extending downwardly, members carried by the wheel cooperating with the downwardly extending arm of the hammer, a vertically movable adjustable collar carried by the vibratory rod, the upper end of the hammer being provided with a right angled portion in registration with the collar and a coiled spring connected to the hammer and to the vertically disposed vibratory rod.

2. A powder dusting machine comprising a vertically disposed vibratory rod, powder receiving receptacles carried thereby, a substantially vertically disposed hammer pivoted adjacent the lower end of the vertically disposed vibratory rod, a wheel disposed below the hammer, means carried by the wheel for cooperating with the lower end of the hammer and causing the same to oscillate, a vertically adjustable collar carried by the vibratory rod, the upper end of the hammer being provided with an angularly disposed member disposed adjacent the collar, and spring means for normally forcing the angularly disposed portion of the hammer into engagement with the collar.

In testimony whereof I have signed my name to this specification in the presence of two subscribing witnesses.

DANIEL D. SMITH.

Witnesses:
 BENNIE W. SMITH,
 ABIAL WINN.